3,397,253
POLYHYDANTOIN POLYMER PREPARED BY THE REACTION OF GLYCINE DERIVATIVES AND POLYISOCYANATES
Rudolf Merten and Willi Dünwald, Leverkusen, Karl-Heinz Mielke, Cologne-Stammheim, and Eckart Reese, Dormagen, Germany, assignors to Farbenfabriken Bayer Aktiengesellschaft, Leverkusen, Germany, a corporation of Germany
No Drawing. Filed Mar. 4, 1966, Ser. No. 531,798
Claims priority, application Germany, Mar. 23, 1965, F 45,600, F 45,602
17 Claims. (Cl. 260—830)

ABSTRACT OF THE DISCLOSURE

Polyhydantoin polymers may be prepared by heating glycine derivatives and polyisocyanates or polythiosocyanates to temperatures between 80° and 500° C. In an example 370 pts. of N,N'-bis-carbethoxymethyl-4,4' diamino diphenyl methane is condensed with 25 pts. of 4,4' diisocyanate-diphenylmethane in 1000 pts. of cresol at 210° C. for 10 hrs.

An object of this invention is to provide new polymers containing hydantoin rings.

Another object of the invention is to provide processes for preparing these polymers.

One of these processes comprises heating glycine derivatives and polyisocyanates or polyisothiocyanates to temperatures between 80 and 500° C. This heating may be carried out in an organic solvent.

Preferred glycine derivatives for this process are compounds of the general formula

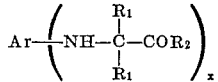

wherein Ar represents an aromatic radical, $R_1$ represents hydrogen or alkyl, $R_2$ represents the hydroxyl group or an amino group, an alkylamino-, dialkylamino-, alkoxy- or aroxy group and x is an integer between 2 and 4. The glycine derivatives used according to the invention should contain the radical

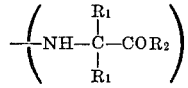

at least twice in the molecule.

The aromatic radical Ar is preferably a radical derived from benzene, azobenzene, naphthalene, anthracene, diphenyl, triphenylmethane, a diphenylalkane, a diphenylalkene, diphenylether, diphenylthioether or a polyphenylether. These radicals may also be substituted once or several times, for example by alkyl- (methyl-), halogen- (chloro-), nitro-, alkoxy- (methoxy-), dialkylamino- (dimethylamino-), acyl- (acetyl-), carbalkoxy- (carbomethoxy or -ethoxy) and cyano groups. Benzene-, naphthalene-, diphenylmethane- and diphenylether derivatives which may be substituted once or twice by methyl groups and/or chlorine atoms are preferred.

The preparation of the glycine derivatives used as starting materials according to the invention is known and may, for example, be carried out by direct reaction of aromatic polyamines with haloacetic acids or derivatives thereof or by condensation with hydrocyanic acid and aldehydes or ketones, followed by conversion of the nitrile group into, for example, carboxylic acid, ester or amide.

The reaction of aromatic polyamines with haloacetic acid or its derivatives is carried out in an organic solvent, e.g. in ethanol, methanol, acetone, benzene or in an aqueous medium with the use of acid binding agents such as tertiary amines (e.g. pyridine, triethylamine), excess starting amine, soda, potash, sodium bicarbonate, potassium bicarbonate, sodium hydroxide, potassium hydroxide, calcium oxide or calcium carbonate.

Suitable haloacetic acids or derivatives thereof are, for example, chloroacetic acid, chloroacetamide, N,N-dialkyl-chloroacetamide (alkyl being preferably methyl, ethyl, butyl), chloroacetic acid esters (e.g. methyl, ethyl, phenyl esters), α-chloropropionic acid esters and α-chloropropionic acid.

Another method consists in condensing aryl polyamines with cyanides (e.g. NaCN, KCN) and oxo compounds (e.g. formaldehyde, acetone, acetophenone) with addition of acids; the nitriles obtained can then be saponified in known manner to form carboxylic acids or converted directly into esters by means of alcoholic hydrochloric acid. Other processes consist in modifying glycine derivatives already prepared, e.g. by esterification of the free acids or aminolysis of the esters.

Suitable aromatic polyamines for use in the invention are compounds having at least two amino groups bound to aromatic nuclei although these must not be arranged in the o- or peri-position. Furthermore, the amines may be substituted in any way desired. Examples of such aromatic polyamines are the following:

m- and p-phenylene diamine,
2,4-, 2,5- and 2,6-toluylene diamine,
diisopropylbenzene diamines,
1,3,5-triaminobenzene,
2,4,6-triaminotoluene,
4,4'-diaminoazobenzene,
2,4,6-triaminoethylbenzene,
1,3,5-triisopropylbenzene-diamines,
2-chloro-1,4-phenylene diamine,
2,5-dichloro-1,4-phenylene diamine,
2,6-dichloro-1,4-phenylene diamine,
2,6-diamino- and 4,6-diamino-5-methyl-1,3-diethyl-benzene,
1,3-, 1,4-, 1,5-, 1,6-, 1,7-, 2,4-, 2,5-, 2,7- and 2,8-diaminonaphthalene,
1,4-diaminoanthraquinone,
1,5-diaminoanthraquinone,
4,4'- and 2,4'-diamino-diphenyl ether,
4,4'- and 2,4'-diamino-diphenylthioether,
4,4'-diamino-diphenyldisulfide,
4,4'-diamino-diphenyl,
4,4'-diamino-3,3'- or -2,2'-dichlorophenyl,
4,4'-diamino-3,3'-dialkoxy-diphenyl,
4,4'-diamino-3,3'-dimethyl-diphenyl,
4,4'-diamino-diphenylmethane,
2,2-bis-p-aminophenyl-propane,
1,2-bis-p-aminophenyl-ethane,
4,4'-diamino-stilbene,
4,4'-diamino-azobenzene,
4,4'-diamino-diphenylsulfon,
4,4',4''-triamino-triphenylmethane,
diamino-carbazole,
2,2''-dichloro-4,4''-diaminotriphenylether and
2,4-diamino-6-phenyl-(1,3,5)-triazine.

High molecular weight compounds containing several aromatically bound amino groups e.g. aniline formaldehyde resins, may also be used.

Suitable polyisocyanates and polyisothiocyanates to be heated with the glycine derivatives are, for example, aliphatic, cycloaliphatic or aromatic compounds having at least two NCO- or NCS-groups in the molecule. The following are examples of such polyisocyanates: Polymethylene diisocyanates of the formula $$OCN-(CH_2)_n-NCO$$

wherein $n$ is a number from 4 to 8, benzene diisocyanates which may be substituted with alkyl groups, for example m- and p-phenylene diisocyanates, toluylene-2,4- and -2,6-diisocyanate, ethylbenzene-diisocyanates, di- and tri-isopropyl benzene diisocyanates, chloro-p-phenylene diisocyanates, diphenylmethane diisocyanates, naphthalene diisocyanates, ester isocyanates such as triisocyanato-arylphosphoric ester and -thioester, glycol-di-p-isocyanato-phenyl ester, 4,4'-diisocyanato-diphenylether, 1,2-bis-p-isocyanato-phenylethane and 4,4' - diisocyanato-stilbene. Partially polymerised isocyanates having isocyanurate rings and free NCO groups may also be used.

The polyisocyanates may also be used in the form of their derivatives, e.g. the reaction products with phenols, alcohols, amines, ammonia, bisulphite, HCl etc. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g. of polyisocyanates with polyalcohols such as ethylene glycol propylene glycol, trimethylolalkanes or glycerol may also be used.

Instead of the polyisocyanates mentioned, the corresponding thio compounds may be used as well.

The process is generally carried out by heating the two starting components for some time in an organic solvent, the polymer produced remaining in solution. The polymer can be isolated by distilling off the solvent. The quantities of starting compounds may be so chosen that 0.5 to 10 mols of isocyanate or isothiocyanate groups are available per mol of $NH_2$ group, and it is preferable to use 1 to 3 mols of isocyanate or isothiocyanate. Suitable solvents for the process are compounds which are inert to NCO—groups, e.g. aromatic hydrocarbons, chlorinated aromatic hydrocarbons, aliphatic hydrocarbons, esters and ketones.

Especially suitable are N-alkylpyrrolidones, dimethylsulphoxide, phenol, cresol and dimethylformamide. Where iso(thio)cyanate derivatives are used, other solvents, such as alcohols or phenols, may also be used. On the other hand, it is also possible to react the components together directly without the use of solvent.

The reaction times vary between 30 minutes and several days and may in special cases lie above or below these limits. The reaction temperatures are chosen to be between 0 and 500° C., depending on the starting material. It is preferred to work at 20 to 350° C., the best results being obtained in the region of 20 to 230° C.

The condensation reactions may be accelerated by the use of catalysts, e.g. metal alcoholates or tertiary amines.

In the polymerisation according to the invention there takes place, in addition to the condensation of the two reactants, a ring closure reaction to form the hydantoin ring, as can be represented by the following reaction equation:

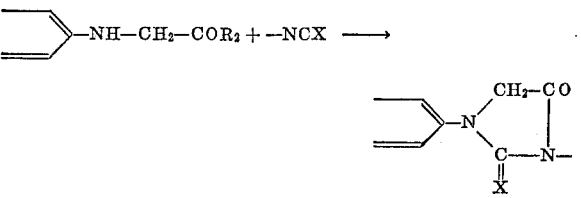

The preferred polymers obtained in this invention contain the recurring unit

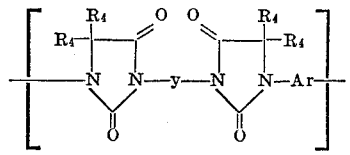

wherein Ar corresponds to the definition already given, $R_4$ represents hydrogen and alkyl having 1 to 6 carbon atoms and $y$ is Ar and additionally alkyl having 4 to 10 carbon atoms (one or more of which may be replaced by oxygen and sulfur) and xylylene. This removing unit may be contained in the polymer about 20 to 5000 times or more.

In another process for preparing the hydantoine polymers of the invention, derivatives of N-carboxy-glycine compounds are heated with polyamines to temperatures between 80 and 500° C. This heating may also be carried out in an organic solvent.

Preferred are N-carboxy-glycine derivatives of the general formula

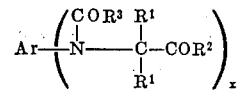

wherein Ar stands for an aromatic radical, $R_1$ is hydrogen or alkyl, $R_2$ is OH, an amino group, an alkylamino group, a dialkylamino group, an alkoxy group or an aroxy group, $R_3$ represents a dialkylamino group, an alkoxy group or an aroxy group and $x$ is an integer between 2 and 4.

Thus, the glycine derivatives to be used according to the invention are required to contain the radical

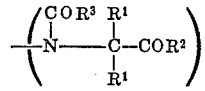

at least twice in the molecule.

The aromatic radicals Ar are preferably the radicals derived from benzene, azobenzene, naphthalene, anthracene, triphenylmethane, diphenylmethane or diphenylether. These radicals may carry one or several substituents for example alkyl- (methyl-), halogen- (chloro-), nitro-, alkoxy- (methoxy-), dialkylamino- (dimethylamino-), acyl- (acetyl-), carbalkoxy- (carbomethoxy- or carboethoxy-) and cyano groups. It is advantageous to use the benzene, naphthalene, diphenylmethane or diphenylether derivatives which may be substituted, once or twice, by methyl and/or chloro functions. The glycine derivatives to be used according to the invention as starting materials prepared according to known methods. By the direct reaction of the corresponding aromatic polyamines with hydrocyanic acid and aldehydes or ketones and subsequent conversion of the nitrile group into the desired carboxyl function, for example carboxylic acid ester or amide or by condensation of the aromatic polyamines with haloacetic acid or derivatives thereof, there are obtained glycine derivatives having a free NH-function which can subsequently be converted into the desired starting materials by means of chlorocarbonic acid alkylester or chlorocarbonic acid arylester. The reaction with the halogen acetic acid or derivatives thereof as well as the chlorocarbonic acid derivatives proceeds in the sense of a Schotten-Baumann reaction, for example in an organic solvent such as ethanol, methanol, acetone or benzene, or in an aqueous medium with the simultaneous use of an acid acceptor, for example a tertiary amine (pyridine, triethylamine), excess starting amine, sodium carbonate, potassium carbonate, sodium hydroxide, potassium hydroxide, calcium hydroxide or calcium carbonate.

This procedure is essentially the same as already described.

The following condensation with chlorocarbonic acid alkylesters or chlorocarbonic acid arylesters, for example chlorocarbonic acid methyl-, -ethyl-, -propyl-, -phenyl- or tolylester, is carried out under substantially equal conditions. It is possible to successively combine several processing steps in one reaction step, for example condensation reactions with chloroacetic acid derivatives and chlorocarbonic acid derivatives. Another method for the preparation of the glycine derivatives to be used according to the invention comprises condensing the corresponding carbamic acid esters having a free NH-group with a chloroacetic acid derivative, in general via the salt of the carbamic ester.

The thus obtained polyfunctional glycine derivatives containing at least twice the group

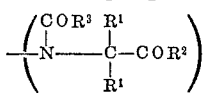

are reacted at elevated temperature with a primary polyamine, i.e. a compound having at least two primary amino groups, yielding the polyhydantoins. The reaction can be represented for example by the following formula

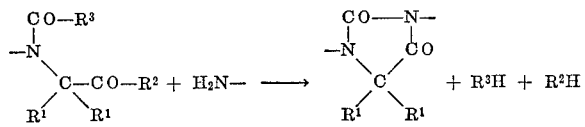

Suitable polyamines for the reaction with the above described glycine derivatives are for example aliphatic, cycloaliphatic and in particular aromatic compounds containing at least two primary amino groups in the molecule. As examples for these polyamines there are mentioned α,ω-diaminoalkanes having two to eighteen carbon atoms in the molecule, such as ethylene diamine, propylene diamine-1,2, and -1,3, 1,4-diaminobutane, hexamethylene diamine, and octamethylene diamine, besides their alkyl substitution products and polymers, such as trimethyl-hexamethylene diamine, diethylene triamine, triethylene tetramine or dipropylene triamine, aminomethyl group-containing aromatics such as 1,3- or 1,4-xylylene diamine as well as the aromatic polyamines mentioned with reference to the preparation of the glycine derivatives.

The process of the invention is generally conducted by heating the two components, preferably in stoichiometric quantities to elevated temperature in order to effect the aminolysis represented by the above equation. This reaction is preferably carried out, at least towards the end of the reaction, in the presence of an aromatic solvent. Suitable solvents for this purpose are inert organic solvents such as aliphatics, aromatics, halogen hydrocarbons, in particular N-alkylpyrrolidones, dimethylformamide, dimethylacetamide, dimethylsulfoxide, phenol and cresols.

The condensation of the components is in general effected within the range between 100 and 350° C., preferably between 140 and 200° C., by preparing, first in the absence of a solvent, a pre-condensation product the molecular weight of which is increased as the reaction progresses at elevated temperature. The condensation reaction can be activated by the use of an acidic, an alkaline or a metal catalyst (sodium carbonate, sodium hydroxide solution, endoethylene piperazine, triethylamine, phosphoric acid, p-toluene sulfonic acid, sodium phenolate, lead oxide or titanium tetrabutylate).

The condensation degree of the resulting polymers containing several hydantoine groups in the molecule is determined by the choice of the quantitative ratio of the glycine derivative and the amino component as well as by the reaction conditions. Polymers of high molecular weight i.e. about above several thousand can immediately be taken up in a solvent at the end of the condensation or after the desired condensation degree has been achieved. For reasons in connection with the processing of the products, the condensation is generally not conducted up to the desired final state. The final state can be achieved after moulding, casting to a film or a foil or after application onto a substrate, by a thermal treatment at temperatures within the range between 100 and 500° C., preferably between 150 and 400° C. It is possible to additionally use other polymers, for example polyesters, polyamides, polyurethanes, polyolefins, polyacetals, polyepoxides, polyimines, polyamidimides, polyiminopolyesters and polyimidisocyanates, which, as far as functional groups (OH- or NCO-groups) are present, can directly be crosslinked with the polyhydantoines.

When heated to elevated temperatures, the polymers of the invention are converted into hard, non-fusible products. It is, therefore, possible to obtain coatings exhibiting outstanding flexibility, surface-hardness, abrasion resistance and resistance to all the conventional solvents such as alcohols, aromatic and aliphatic hydrocarbons, esters, ethers and ketones, and even to water, by applying solutions of these polymers in suitable solvents or solvent mixtures, to heat-resistant supporting bases comprising for example, metals, ceramics, glass or asbestos fibres, or fabrics made from such fibres, or even to other adequately temperature-resistant synthetics, and then stoving at elevated temperatures.

Particularly suitable are polycondensates containing hydantoin or thiohydantoin rings, which are linked through their nitrogen atoms by bivalent organic groups, such as alkylene groups containing 4 to 10 carbon atoms, phenylene groups, toluylene groups, diphenylene groups and diphenylether groups.

Generally, coatings are prepared from the condensates containing hydantoin or thiohydantoin rings by dissolving these substances in a suitable solvent, applying the resulting solution to a substrate, followed by hardening at temperatures of 150 to 500° C. These solutions preferably have a solids content of 10 to 50% by weight.

The solvents preferably used in the preparation of solutions of these polycondensation products include dialkylamides, for example, dimethyl formamide or diethyl acetamide, as well as N-methyl pyrrolidone, dimethyl sulphoxide or cresols.

The outstanding and desirable properties of the polymers remain largely unaffected, or can be varied as required, when other polymers known per se are jointly used, for example, polyesters, polyamides, polyurethanes, polyolefins, polyacetals, polyepoxides, polyimides, polyamide-imides, polyimino-polyesters and polyimide isocyanates. The quantities in which these polymers are used will largely depend upon the properties required of the end product and the weight ratio of the polymers of the invention to the known polymers may conveniently vary from 10:90 to 90:10. They are preferably mixed in a weight ratio of 30:70 to 70:30. These known polymers may be added to the polyhydantoins, or may even be incorporated in them by polymerisation and condensation.

One preferred embodiment comprises jointly using polyesters containing hydroxyl groups in the presence of excess quantities of isocyanate or isothiocyanate components, resulting in the combined formation of thiohydantoin and urethane. For this purpose, it is possible, for example, to convert mixtures of the polyhydroxyl compound, polyisocyanate or polyisothiocyanate derivative, and polyglycine derivative, optionally after pre-condensation of two of these components into the synthetic, in a simultaneous final operation.

Suitable polyesters containing hydroxyl groups include the known types which can be obtained by routine methods from polycarboxylic acids, for example succinic acid, adipic acid, sebacic acid, phthalic acid, isophthalic acid, terephthalic acid or maleic acid, and polyalcohols, for example, glycol, diethylene glycol, triethylene glycol, propylene glycol, dipropylene glycol, glycerol, 1,1,1-trimethylol propane or pentaerythritol.

It has been found that when several such layers are applied, one above the other, they remain very firmly bonded to one another. This property may be exploited with advantage for the preparation of laminates, for example by lacquering glass cloths with such a solution, and, after drying at low temperatures, stacking them one above the other to form several layers which are then hardened under pressure and heat. In this way, laminates exhibiting outstanding mechanical properties such as high impact strength, flexural strength and resilience, are obtained.

Similarly, mica wafers lacquered with such a solution, can be bonded together to produce a valuable material which may be used, for example, in the electrical industry.

By virtue of their outstanding electrical insulating properties, solutions of such products may, in addition, be used to advantage for electrical insulation. An electric coil is dipped into such a solution, after which the coil thus impregnated is stoved in an oven at about 150° C. In this way, the coil is baked solid and provides mechanical protection, even at fairly high temperatures. combined in some instances with centrifugal forces. For this purpose, the dip tank, should preferably be at a temperature of some 50° C. because, at such a temperature, the viscosity of the solution is low enough for it fully to penetrate the tightly wound coil and thus to ensure proper baking. Products yielding hard and at the same time tough films have proved to be particularly suitable for this purpose. Examples of such products are those which can be obtained inter alia by reacting glycine derivatives of 4,4'-diaminodiphenyl methane with 2,4-toluylene diisocyanate. The baking index of such a lacquer at 155° C. is 3.2 as measured in accordance with VDE 0360.

The same lacquer solution may also be applied as a covering lacquer over already impregnated and baked coils in order to increase further the mechanical strength of the coil.

A flexible material is usually required for the preparation of imprenated fabrics of the type used as bendaging materials or as insulating tubing. A material of this type can be obtained by using cycloaliphatic or aliphatic diisocyanates carrying a fairly long and hence fairly labile carbon chain. Although reaction products of the glycine derivative of 4,4'-diaminodiphenyl ether with 1,6-hexamethylene diisocyanate are preferably used for this purpose, it is also possible to use similarly synthesised diisocyanates, for example, hexamethylene, dithiosocyanate or 1,4'-diisocyanato-dibutyl ether.

An important field in which these polyhydantoins can be used is wire enamelling. In this instance, the processing requirements and the properties of the electric conductor coated with these materials are particularly diverse. The enamelling solution has to be adjusted to the different types of coating machines used. The wire generally passes through an enamelling bath, behind which any excess enamel is removed by a special stripping system. This may consist of two felt pads pressed against one another through which the wire is passed. This process requires an enamel of fairly low viscosity which may be obtained by selecting a suitable solvent with a solids content of up to 40% by weight, preferably from 20 to 30% by weight. The diameter of the wire to be enamelled is also important. The increases in the diameter of the wire which can be obtained by enamelling, are laid down in DIN specifications Nos. 46,453 and 46,435. Solutions of higher viscosity or even of higher solids content are generally "stripped" by means of metal stripper nozzles.

The wire then passes through a stoving oven in which the solvent is evaporated by the action of heat, and the film of enamel is hardened. This process is repeated several times until the required layer thickness is obtained. 6 to 8 coatings are generally required for this purpose.

In an enamelling test on a 0.7 mm.-diameter wire, the oven is, for example, 4, 2-metres long and the temperature is 400° C. The rate at which the wire is drawn through the oven is 6 metres per minute. This rate may be increased to 10 metres per minute without impairing the properties of the resulting enamelled wire. By applying 6 coats of enamel, an increase in diameter $d_2-d_1$, where $d_2$ is the diameter of the enamelled wire and $d_1$ is the diameter of the bare copper wire, of 64 m$\mu$ is obtained, i.e. the film of enamel is 32 m$\mu$-thick. The enamelled wire thus obtained shows an outstanding resistance to abrasion and behaves satisfactorily when exposed to thermal shock treatment. It also exhibits a high resistance to abrasion and outstanding dielectric strength and hardness.

During abrasion-resistance testing by the NEMA-method, between 100 and 150 repeated scrapes were completed. The weight applied varied between 550 and 600 g. depending upon the thickness of the film of enamel.

If the wire is wound around a mandrel with the same diameter, i.e. 0.7 mm., and the resulting coil of wire, is placed in a heating cabinet pre-heated to 260° C., it is not possible to detect any cracks or breaks in the film of enamel after a test period of 60 minutes (thermal shock test according to DIN 46,453).

To determine the softening temperature in accordance with DIN 46,453, the enamelled wire is placed under a steel needle crossing it at an angle of 90° C. to which a weight of 1 kg. is applied. A voltage of 150 v. is applied between the steel needle and the copper. This test rig is arranged inside a heating cabinet whose temperature is raised at a rate of 50° C. per hour. In the temperature range in which the film softens due to its thermoplasticity, the steel needle penetrates through the film of enamel. The direct contact between the steel pin and the copper wire creates an acoustic signal, indicating the end of the test. In all the tests carried out on enamelled wires within the range referred to above (400° C., 6 to 10 metres per minute), it was possible to heat the oven to its ultimate temperature of 330° C., without the film of enamel being ruptured by the steel needle.

The breakdown voltage as measured on twisted wire specimens (DIN 46453) is between 8 and 9 kv.

The hardness of the enamel film (DIN 46453) is 5H. There is no change in hardness even when the enamelled wire is submerged for 30 minutes in ethanol at 50° C.

In addition, the enamelled wire does not crack or craze when flexed underwater. For testing, the wire is bent around a 10 mm-diameter mandrel in a 0.5% by weight solution of sodium chloride, whilst a D.C. voltage of 100 v. is applied across the water bath and the copper conductor. Cracking or crazing would initiate the flow of current which, in turn, would light an interconnected control lamp.

In general, the enamel solutions according to the invention contain suitable solvents or solvent mixtures. Experience has shown that diluents, too, may also be used in certain quantities. Suitable solvents include, for example, aromatic hydrocarbons, chlorinated aromatic hydrocarbons, aliphatic hydrocarbons, esters and ketones. N-alkyl pyrrolidone, dimethyl sulphoxide, dimethyl sulphone, dimethyl formamide, diethyl acetamide, phenol and cresol or mixtures thereof, are particularly suitable.

The solids content of the solutions may vary within wide limits and is governed both by the type of binder used and its solvent power and by the proposed method of application. Solutions with a solids content of 10 and 60% by weight may be regarded as generally suitable. For example, a solids content of 10 to 45% by weight will be used in enamels for coating wires on the conventional enamelling machines, depending on the method of application and the thickness of the wire. By contrast, impregnating enamels used to impregnate coils will generally have a solids content of 35 to 50% by weight.

It has also been found that the hardening reaction can be accelerated by the addition of suitable catalysts, i.e. the reaction time is shortened or the stoving temperature simultaneously lowered. This is of importance as far as complete hardening is concerned in the case of wire-enamelling machines operating at a particularly high rate. Such catalysts include organometallic compounds such as, for example, compounds of titanium, lead, copper, iron or of the alkaline-earths. It would also be possible to use amino- and ammonium compounds, in particular quaternary salts such as, for example, tetramethyl-ammonium acetate, tetramethylammonium, terephthalate and choline octoate. These catalysts are generally used in a ratio of 0:0.05 to 3.0% based on the solids content of the enamel. Although the catalysts may be used in larger quantities, this does not produce any apparent advantages.

PREPARATION OF STARTING COMPOUNDS (A) 400 parts by weight of 4,4'-diaminodiphenylmethane, 200 parts by weight of calcium carbonate and 500 parts by weight of water are heated to boiling, and 488 parts by weight of ethyl chloroacetate are then added dropwise at a rate adjusted to the rate of evolution of carbon dioxide. A second organic layer is produced which is separated while still hot from the $CaCl_2$ solution and washed with hot water. The organic phase solidifies on cooling, is washed with ethanol on a vacuum filter and then recrystallised from ethanol. On drying, 518 parts by weight of N,N'-bis-carbethoxymethyl-4,4'-diaminodiphenylmethane of M.P. 84–85° C. are obtained.

(B) 200 parts by weight of 4,4'-diaminodiphenylether, 500 parts by weight of ethanol, 140 parts by weight of potash are heated to 70° C. and 244 parts by weight of ethyl chloroacetate are added dropwise in the course of 4 hours. The reaction mixture is kept for a further 4 hours at 70° C. and then filtered hot, and the residue is boiled with more ethanol. From the solution in ethyl alcohol, if necessary after concentration by evaporation, there are obtained on cooling, 225 parts by weight of N,N'-bis-carbethoxymethyl-4,4'-diamino-diphenyl ether of M.P. 90° C.

(C) 198 parts by weight of 4,4'-diaminodiphenylmethane, 186 parts by weight of chloroacetic acid, 1000 parts by weight of $H_2O$ and 80 parts by weight of NaOH are boiled under reflux for 4 hours, cooled, filtered and washed with water. The product can be recrystallised from water. The yield is practically quantitative, the M.P. is 162° C.

Example 1

370 parts by weight of N,N'-bis-carbethoxymethyl-4,4'-diaminodiphenylmethane are introduced at 150° C. into 1000 parts by weight of cresol to which 250 parts by weight of 4,4'-diisocyanate-diphenylmethane have previously been added, and the reaction mixture is then condensed for 10 hours at 210° C. (or 20 hours at 180° C.).

After removal of the solvent and reheating to 230° C. a polycondensate is obtained which does not melt at temperatures of up to 400° C. and shows in the IR spectrum the typical absorption bands for hydantoins.

Instead of cresol, one may use phenol, dimethylacetamide, dimethylformamide or N-methylpyrrolidone.

Examples 2–15

In a manner analogous to Example 1, the following combinations (in parts by weight) are converted via cresol solutions into polyhydantoin resins:

No. 2

10.4 parts by weight

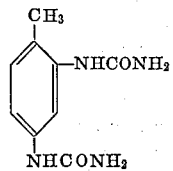

11.2 parts by weight

HOOC—CH₂—NH—⟨⟩—NH—CH₂—COOH

No. 3

25 parts by weight

OCN—⟨⟩—CH₂—⟨⟩—NCO 38.4 parts by weight

H₅C₂OOC—CH₂—NH—⟨⟩—S—⟨⟩—
—NH—CH₂—COOC₂H₅

No. 4

25.2 parts by weight

OCN—⟨⟩—O—⟨⟩—NCO 53.3 parts by weight

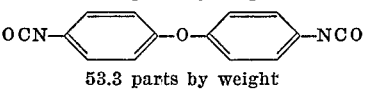

No. 5

26.8 parts by weight

OCN—⟨⟩—S—⟨⟩—NCO 38.0 parts by weight

H₅C₂OOC—CH₂—NH—⟨⟩—CH₂—CH₂—
—⟨⟩—NH—CH₂—COOC₂H₅

No. 6

26.4 parts by weight

OCN—⟨⟩—CH₂—CH₂—⟨⟩—NCO 35.6 parts by weight

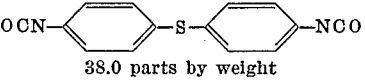

No. 7

26.2 parts by weight

OCN—⟨⟩—CH=CH—⟨⟩—NCO 37.8 parts by weight

H₅C₂OOC—CH₂—NH—⟨⟩—CH=CH—
—⟨⟩—NH—CH₂—COOC₂H₅

No. 8

10.4 parts by weight

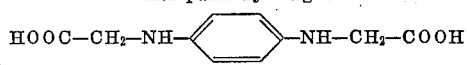

15.7 parts by weight

HOOC—CH₂—NH—⟨⟩—CH₂—⟨⟩—NH—CH₂—COOH

No. 9

12.5 parts by weight

OCN—⟨⟩—CH₂—⟨⟩—NCO 15.7 parts by weight

HOOC—CH₂—NH—⟨⟩—CH₂—⟨⟩—NH—CH₂—COOH

No. 10

10.5 parts by weight

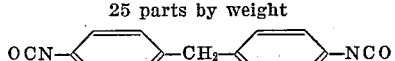

15.7 parts by weight

HOOC—CH₂—NH—⟨⟩—CH₂—⟨⟩—NH—CH₂—COOH

No. 11

4.2 parts by weight
OCN—(CH₂)₆—NCO
4.2 parts by weight

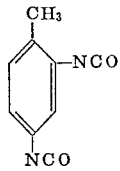

11.2 parts by weight

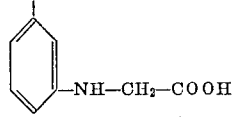

No. 12

37 parts by weight

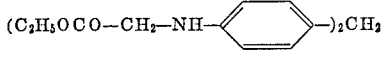

34 parts by weight

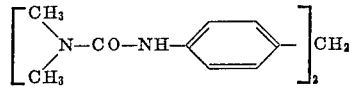

No. 13

36.8 parts by weight

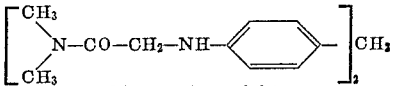

34 parts by weight

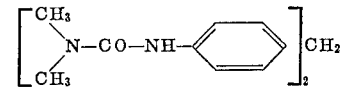

No. 14

33.4 parts by weight

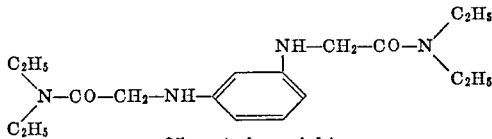

25 parts by weight

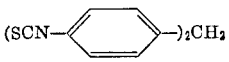

No. 15

14.1 parts by weight

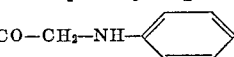

18.5 parts by weight

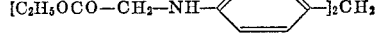

(shows bands of the thiohydantion system in the IR spectrum)

Example 16

In an experiment analogous to Example 1, carried out for the purpose of modifying the synthetic resins, 660 parts by weight of the solution obtained in that Example are mixed with 20 parts by weight of a polyester containing imide groups, which polyester had been prepared from 200 parts by weight of ethylene glycol, 92 parts by weight of glycerol, 75 parts by weight of 3-aminopropanol, 109 parts by weight of pyromellitic acid dianhydride and 432 parts by weight of terephthalic acid-bisglycol ester at 200° C. in vacuo (555 parts by weight of ester, cp.₂₅ 4950 in 33.5% cresol solution), and the mixture was then worked up as in Example 1.

Example 17

In a manner analogous to Example 16 34.6 parts by weight of an epoxy resin obtained from epichlorohydrin and diphenylol propane and having an epoxy equivalent of 1700 to 2000 are added.

Example 18

In a manner analogous to Example 16, 40 parts by weight of a modified polyethylene terephthalate (from 1.7 moles terephthalic acid-bisglycol ester and 0.76 mol of glycerol with removal of glycol of distillation until a 35% cresol solution has a viscosity of 5700 cp.₂₅) are added.

Example 19

74 parts by weight of N,N'-bis-ethoxycarbonylmethyl-4,4'-diamino-diphenylmethane of m.p. 88°, purified by recrystallisation from ethyl acetate and ethanol, were dissolved in 290 parts by weight of distilled cresol and at 40°, a total of 50 parts by weight of 4,4'-diisocyanate-diphenylmethane was added in two portions. The reaction mixture is then heated for another 6 hours at 200°. The solution obtained (394 parts by weight) is found, after dilution with an equal quantity of cresol, to have a viscosity of 2200 cp.₂₅.

The solution was painted on to glass plates, and after one hour's heating at 230° it yielded an elastic foil which was not cross-linked and which had a high temperature resistance (softening above 360°); it had the typical IR absorptions for hydantoins.

The solution obtained can also be precipitated by treatment with acetone, ethyl acetate or glycol monomethyl ether acetate. In that case, about 105 parts by weight of a solid product are obtained which has a similar spectrum as the heated film and can be dissolved in cresol and then be heated to form a similar film again.

Example 20

To 79.6 parts by weight of N,N'-bis-(methoxycarbonyl-dimethyl-methyl)-4,4'-diamino - diphenylmethane (mp. 117°) in 302 parts by weight of cresol are added at 160° 50 parts by weight of 4,4'-diisocyanate-diphenylmethane, and the mixture is heated for 10 hours at 200°. After dilution with an equal quantity of cresol, the solution obtained has a viscosity of 650 cp.₂₅ and can be worked up into a film by method analogous to Example 19.

Example 21

61.6 parts by weight of N,N'-bis-(methoxycarbonyl-dimethyl-methyl)-m-phenylenediamine are dissolved in 261 parts by weight of cresol, and 50 parts by weight of 4,4'-diisocyanate-diphenylmethane are added at 40°. The temperature of the reaction mixture is raised to 200° in 3 hours and kept at 200° for 6 hours. A solution of the polyhydantoin is obtained which, after dilution with an equal part of cresol, has a viscosity of 185 cp.₂₅ and shows in the IR spectrum the typical absorption bands of a hydantoin.

Example 22

50 parts by weight of 4,4'-diisocyanate-diphenylmethane are added at 50° to 30.8 parts by weight of N,N' - bis - (methoxycarbonyl-dimethyl-methyl)-4,4'-diaminodiphenyl methane, 37 parts by weight of N,N'-bis-ethoxycarbonyl-methyl-4,4'-diaminodiphenylmethane and 275 parts by weight of cresol, and the reaction mixture is heated in the course of 3 hours to a temperature of 200° and the temperature maintained at 200° for 3 hours. The solution obtained in a quantity of 379 parts by weight shows in the IR spectrum the typical hydantoin bands, and after dilution with an equal quantity of cresol it has a viscosity of 419 cp.₂₅.

Example 23

67.6 parts by weight of N,N'-bis-ethoxycarbonyl-methyl-4,4'-diamino-diphenylmethane and 10.9 parts by weight of the N,N',N''-tris-(ethoxycarbonyl-methyl)-4,4',4''-triamino-triphenylmethane which has been prepared by an analogous method are reacted, in a manner analogous to Example 21, with 50 parts by weight of 4,4'-diisocyanate-diphenylmethane.

Example 24

In an example analogous to Example 23, 9.15 parts by weight of N,N',N''-tris-ethoxycarbonyl-methyl-2,4,4'-triamino-triphenyl (M.P. 102°) are put into the reaction as the trifunctional component.

Example 25

74 parts by weight of N,N'-bis-ethoxycarbonyl-methyl-4,4'-diamino-diphenylmethane are first reacted in 310 parts by weight of cresol at 80° with 13.6 parts by weight of a compound which splits off isocyanurate-triisocyanate phenyl, which compound was prepared from 2,4-toluylene diisocyanate by 50% polymerisation of the NCO group followed by treatment with phenol with an NCO content of 12.4%. The reaction mixture is kept at a temperature of 80° for one hour and then briefly heated to 160°/12 mm. Hg to remove the ethanol formed, and then cooled to 50°, and then 45 parts by weight of 4,4'-diisocyanate-diphenylmethane are added. The solution is converted into the required final state by heating at 200° over 6 hours.

Example 26

21 parts by weight of

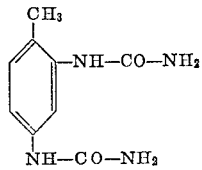

and 22.5 parts by weight of N,N'-bis-carboxymethyl-p-phenylene diamine, were each dissolved in 50 parts by weight of industrial cresol. The two solutions were mixed together and, following their application to a sheet of metal, were stoved for one hour at 250° C. A smooth and scratch-resistant film with an outstanding resistance to solvents was obtained.

Example 27

74 parts by weight of

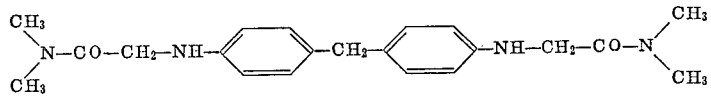

and 68 parts by weight of

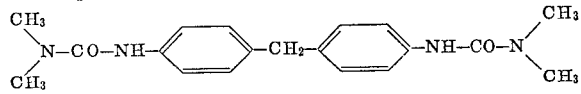

were together dissolved in 200 parts by weight of cresol. 3 parts by weight of a mixture of lead naphthenate and zinc octoate in a weight ratio of 2:8 was added to the resulting solution. A dark-brown enamelling solution was obtained which was applied to a sheet of hard asbestos. Following stoving for 2 hours at 200° C., a hard glossy coating was obtained which was highly resistant to elevated temperatures.

Example 28

42 parts by weight of

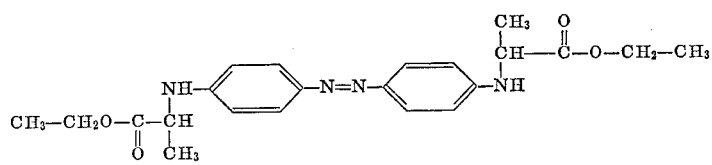

were dissolved in 50 parts by weight of dimethyl formamide, and 20 parts by weight of toluylene-2,4-diisocyanate were added to the resulting solution with stirring and gradual heating. On completion of this addition, heating was continued from 15 minutes until the solution began to boil gently. It was then cooled to 50° C., after which a solution of 20 parts by weight of a polyester with 5.5% by weight of OH and an acid number of 4.1, dissolved in 40 parts by weight of cresol, was added. The polyester was obtained by esterifying 2 mols of adipic acid, 2 mols of terephthalic acid, 3 mols of 1,1,1-trimethylol propane and 2 mols of ethylene glycol. The enamelling solution thus obtained was further diluted with 33 parts by weight of ethylene glycol methyl- or ethyl-ether acetate, and applied by "dip-coating" to a sheet of deep-drawn steel. After most of the solvent had been evaporated off at room temperature, the solution was stoved for 1½ hours at 180° C. in an oven. A glossy, heat-resistant and elastic film of outstanding surface hardness was obtained.

Example 29

105 parts by weight of naphthalene-1,5-diisocyanate and 157 parts by weight of N,N'-bis-carboxymethyl-4,4'-diaminodiphenyl methane, were separately dissolved in 250 parts by weight of cresol. The resulting solutions were used to impregnate a glass cloth. The cloth was first dried in air and then pre-condensed for some 10 minutes to 120° C. Several such cloths were then laid one above the other, and placed in a press to harden under pressure and heat. The pressure should not exceed 50 kg./cm.² for the first two minutes, although, thereafter, it can be raised to about 150 kg./cm.². The temperature of the press was 180 to 200° C. The total pressing time depended upon the thickness of the laminate, i.e. upon the number of layers. In the case of a "wafer" approximately 3 mm. thick, the pressing time was 10 minutes. In this way, a solid, heat-resistant laminate of outstanding flexural strength and impact strength was obtained.

Example 30

100 parts by weight of dimethyl formamide were added to the lacquering solution according to Example 29. Sheet mica wafers moistened with the resulting solution were dried at a slightly higher temperature (50 to 70° C.). The mica wafers thus lacquered were jointed together in the usual way and hardened between polished plates in a press at 180 to 200° C. Laminated mica plates were obtained which exhibit an outstanding resistance to elevated temperatures, coupled with outstanding electrical insulation properties.

Example 31

370 parts by weight of

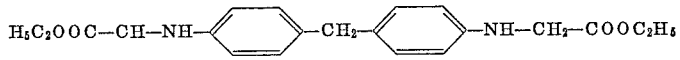

were dissolved in 400 parts by weight of dimethyl formamide. 180 parts by weight of hexamethylene-1,6-diisocyanate and 100 parts by weight of a polyester with 5% by weight of OH groups and an acid number of 1.2, dissolved in 300 parts by weight of ethylene glycol acetate, were added to the resulting solution. The polyester was obtained by esterifying 3 mols of adipic acid, 1 mol of 1,1,1-trimethylol propane and 3 mols of butylene glycol. This mixture was heated for 4 hours at 130° C. and then cooled. It was further diluted with 1000 parts by weight of a solvent mixture of 3 parts by weight of cresol, 4 parts by weight of methyl isobutyl ketone and 3 parts by weight of ethylene glycol methyl ether acetate.

A glass cloth was coated with this lacquer solution on a suitable apparatus and then hardened in a tunnel oven with a shaft approx. 8 metres long, at a temperature of 290° C. The lacquered cloth was drawn through the oven at a rate of 1 to 2 metres per minute. A flexible, lacquered cloth was obtained which exhibited outstanding electrical properties which were unaffected by prolonged ageing at elevated temperature.

Example 32

370 parts by weight of N,N'-bis-carbethoxymethyl-4,4'-diamino-diphenyl methane were added at 150° C. to a mixture of 1000 parts by weight of cresol and 250 parts by weight of 4,4'-diisocyanato diphenyl methane and the whole was condensed for 6 hours at 180° C. The resulting enamel solution had a viscosity of 25,000 cp. at 25° C., and was further diluted with a mixture of 570 parts by weight of xylene and 330 parts by weight of cresol. A copper wire of 0.7 mm. diameter was coated with the diluted enamel solution in known manner by 6 passages of the wire through an enamelling machine. The enamelled wire showed good abrasion-resistance and a cut-through-temperature in excess of 300° C.

Example 33

372 parts by weight of N,N'-bis-carbethoxy methyl-4,4'-diphenyl ether were added at 150° C. to a previously-prepared mixture of 1300 parts by weight of cresol and 236 parts by weight of 4,4'-diisocyanato diphenyl ether, and the whole was condensed for 6 hours at 180° C. After cooling, 600 parts by weight of xylene were added and the resulting enamel solution was used to enamel a copper wire in the manner described in the previous example. The coated copper wire possessed a good resistance to heat shock, a cut-through-temperature above 330° C. and an outstanding abrasion-resistance.

Example 34

34.6 parts by weight of a solution in cresol of an epoxide compound with an epoxide equivalent of 1700 to 2000 prepared by reacting epichlorohydrin and diphenylol propane in 305 parts by weight of cresol; were added to 660 parts by weight of the solution according to Example 33.

The enamelled wires coated with this enamel solution were highly resilient.

Basically, it is possible to combine epoxide resins with epoxide equivalent weights of 400 to 4000. Epoxide resins based on aromatic amines and epichlorohydrin as well as those based on cycloaliphatic epoxide compounds, are also suitable. By virtue of the multiplicity of possible combinations and mixing ratios, it is again possible to modify flexibility within the wide limits.

Example 35

372 parts by weight of N,N'-bis-carbethoxymethyl-4,4'-diphenyl ether were dissolved in 1,000 parts by weight of cresol. A solution of 846 parts by weight of a masked isocyanate with the following composition

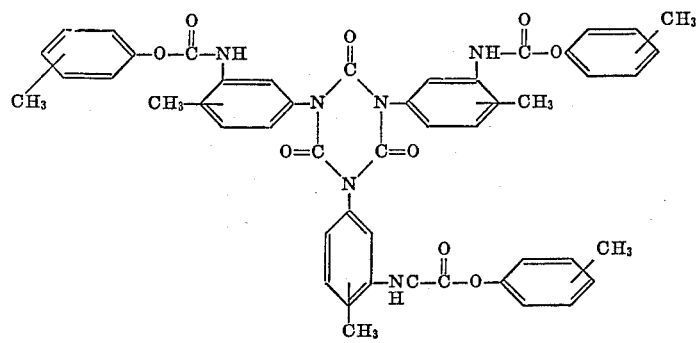

in 1500 parts by weight of cresol/xylene (1:1% by weight) were added to the resulting solution. The mixture was then heated for 6 hours at 170 to 180° C., followed upon cooling by the addition of another solution of 460 g. of a polyester in 1250 parts of cresol. The polyester with 5% by weight OH groups was obtained by condensing 8 mols of dimethyl terephthalate with 6 mols of ethylene glycol, 1 mol of 1,1,1-trimethylol propane and 2 mols of glycerol. The solution was then further diluted while stirring with 1000 parts by weight of xylene, and the resulting solution was used to enamel a 0.3 mm. diameter copper wire in the usual way. An enameled wire was obtained which had a high resistance to elevated temperatures, outstanding resistance to heat shock up to about 250° C., good abrasion resistance, a high resistance to solvents and a high cut-through-temperature.

Example 36

20 parts by weight of polyester carrying imide groups, dissolved in 372 parts by weight of cresol, were added to 606 parts by weight of the solution prepared as in Example 33. This polyester was prepared at 200° C. in vacuo from 200 parts by weight of ethylene glycol, 92 parts by weight of glycerol; 75 parts by weight of 3-amino-1-propanol, 109 parts by weight of pyromellitic acid dianhydride and 432 parts by weight of terephthalic acid-bis-glycol ester in the presence of 0.4 part by weight of PbO and 2.1 parts by weight of zinc octoate (555 parts by weight of product with a viscosity of cp.$_{25}$=4950 in the form of a 33.5% by weight solution in cresol).

A 0.5-mm.-diameter copper wire was enamelled in known manner with the solution thus prepared. The resulting enamelled wire was highly flexible and exhibited an outstanding resistance to heat shock, a high cut-through-temperature and a high dielectric strength. Its permanent resistance to elevated temperature was very high, i.e. the date as measured remained unaffected even after prolonged storage at elevated temperature.

Example 37

500 parts by weight of the enamelling solution as prepared in accordance with Example 34, were mixed with 250 parts by weight of a solution of a condensate which contained imide and amide groups and which was prepared as follows:

A mixture of 40 parts by weight of 4,4'-diamino-diphenyl ether and 38.4 parts by weight of trimellitic acid anhydride, was heated for 6 hours at 150 to 205° C. in a sealed pressure vessel. After cooling, the reaction vessel was opened, after which its contents were heated again for 30 minutes at 220° C. in the presence of nitrogen pumped in at normal atmospheric pressure. The resulting condensation product was dissolved in 285 parts by weight of a mixture of dimethyl sulphoxide and diethyl acetamide in a weight ratio of 1:1.

A 0.5-mm.-diameter copper wire enamelled with this combination was highly resistant to elevated temperatures, and, apart from being highly flexible and exhibiting a high softening temperature, also showed an outstanding resistance both to abrasion and to heat shock.

Example 38

74 parts by weight of an N,N'-bis-ethoxycarbonylmethyl-4,4'-diaminodiphenyl methane (M.P. 88° C.) purified by recrystallisation from ethyl acetate and ethanol were dissolved in 290 parts by weight of distilled cresol, and the resulting solutions added in 2 portions at 40° C. to a total of 50 parts by weight of 4,4'-diisocyanato-diphenylethane. The resulting mixture was then heated for 6 hours at 200° C. The resulting solution (394 parts by weight) had a viscosity of 2200 $cp._{25}$ after dilution with an equivalent quantity of cresol.

The solids in the solution thus obtained could, in addition, be precipitated by esterification with acetone, ethyl acetate or ethylene glycol-monomethylether acetate. In this way, approx. 105 parts by weight of a solid product were obtained which could be re-dissolved to form a similar cresol solution.

A solution suitable for enamelling copper wires was obtained by diluting the aforementioned 30% by weight cresol solution to a solids content of 20% by weight, with a solvent mixture of xylene/cresol in a weight ratio of 1:1. Enamelling as in Example 33 produced enamelled wires of outstanding flexibility, high resistance both to heat shock and to solvents, a high softening point and outstanding abrasion resistance.

Example 39

50 parts by weight of 4,4'-diisocyanato-diphenyl methane were added at 60° C. to 79.6 parts by weight of N,N'-bis-(methoxycarbonyl-dimethyomethyl) - 4,4' - diaminodiphenyl methane (M.P. 117° C.) in 302 parts by weight of cresol, and the resulting mixture was heated for 10 hours at 200° C. Following dilution with an equivalent quantity of cresol, the resulting solution had a viscosity of 650 $cp._{25}$.

After cooling, a solution of 150 g. of the terephthalic acid polyester prepared as in Example 36 in 550 g. of cresol, was added to 500 g. of the 30% by weight solution thus obtained. 1.5 g. of polymeric butyl titanate were dissolved in approximately 20 cc. of cresol, and the resulting solution was briefly heated. On cooling, the solution was added to the enamel solution, and the resulting mixture was used to enamel a copper wire. Apart from an outstanding resistance to heat shock and a high softening point, the wire thus enamelled also exhibited outstanding "windability" which was not even affected by 14 days' aging at 200° C.

Example 40

61.5 parts by weight of N,N'-bis-(methoxycarbonyldimethylmethyl)-m-phenylene diamine were dissolved in 261 parts by weight of cresol, followed by the addition to the resulting solution at 40° C. of 50 parts by weight of 4,4'-diisocyanatodiphenylmethane. The temperature was raised over 3 hours to 200° C. and kept at this level for another 6 hours. A solution of a polyhydantoin was obtained which, after dilution with an equivalent quantity of cresol, had a viscosity of 185 $cp._{25}$ and whose infrared spectrum showed the absorption bands typical of a hydantoin. 50 parts by weight of a polyester of adipic acid, terephthalic acid, trimethylol propane and ethylene glycol (prepared as in Example 28) in 100 parts by weight of cresol, were added to 500 parts by weight of the 30% by weight cresol solution. The resulting solution was diluted with 150 parts by weight of ethylene glycol acetate. The enamelling solution thus obtained was applied to a sheet of metal and, following evaporation, was stoved for 1½ hours at 180 to 200° C. The resulting heat-resistant film had an extremely hard surface.

Example 41

50 parts by weight of 4,4'-diisocyanato-diphenylmethane were added at 50° C. to 80.8 parts by weight of N,N'-bis-(methoxycarbonyl-dimethylmethyl)-4,4' - diaminodiphenylmethane, 37 parts by weight of N,N'-bis-ethoxycarbonyl-4,4'-diaminodiphenyl methane and 275 parts by weight of cresol. The temperature was then raised over a period of three hours to 200° C. and was kept at this level for another 3 hours. The resulting solution obtained in a quantity of 379 parts by weight showed the characteristic hydantoin bands in the infra-red spectrum and, following dilution with an equivalent quantity of cresol, had a viscosity of 419 $cp._{25}$.

This solution diluted with cresol to a solids content of 20% by weight was used to enamel copper wires. The wires thus enamelled had an outstanding resistance to heat shock, were extremely hard and had a softening point of over 330° C.

Example 42

67.6 parts by weight of N,N'-bis-ethoxycarbonylmethyl-4,4'-diaminodiphenyl methane and 10.9 parts by weight of the similarly prepared N,N',N''-tris-(ethoxycarbonylmethyl)-4,4',4''-triaminotriphenyl methane, reacted as in Example 41 with 50 parts by weight of 4,4'-diisocyanatodiphenyl methane.

The solution thus obtained was diluted with cresol to a solids content of 22% by weight and then used in the form already described to enamel copper wire 0.7 mm. in diameter. The resulting enamelled wires had an extremely hard surface and high cut-through-temperature of over 330° C.

Example 43

9.15 parts by weight of N,N',N''-tris-(ethoxycarbonylmethyl)-2,4,4'-triaminotriphenyl (M.P. 102° C.) were used as the trifunctional component in an example similar to Example 42.

Following dilution with cresol to a solids content of 22% by weight the soltuion was used to enamel a copper wire 0.7-mm. in diameter. The resulting enamelled wire had a hardness of 5H. There was no drop in this value even after the enamelled wire was submerged for 30 minutes in ethanol at 50° C. Apart from high abrasion resistance, the enamelled wire was also found to have a high cut-through-temperature.

Example 44

74 parts by weight of N,N'-bis-ethoxycarbonylmethyl-4,4'-diaminodiphenyl methane, were first of all reacted at 80° C. in 310 parts by weight of cresol with 13.6 parts by weight of a masked isocyanurate-triisocyanatophenyl prepared from 2,4-toluylene diisocyanate by polymerisation of half of the NCO-groups, followed by treatment with phenol containing 12.4% by weight of NCO groups. The temperature was kept for one hour at 80° C. and then briefly raised to 160° C./12 mm. Hg in order to remove the ethanol formed. The product was then cooled to 50° C., after which another 45 parts by weight of 4,4'-diisocyanatodiphenyl methane were added. The solution was finally heated for 6 hours at 200° C.

The resulting solution was diluted with cresol to a solids content of 22% by weight. An enamelled wire coated with this material exhibited a high resistance to thermal shock, outstanding hardness and a high resistance to solvents. The cut-through-temperature was above 330° C., whilst the abrasion resistance amounted to 100 repeated scrapes.

Example 45

37.5 parts by weight of 4,4'-diisocyanatodiphenyl methane were added at 50° C. to 74 parts by weight of N,N' - bis - ethoxycarbonylmethyl - 4,4' - diaminodiphenyl methane and 260 parts by weight of cresol, and the resulting mixture was heated for two hours at 200° C. The resulting solution had a viscosity of 118 cp.$_{25}$.

To 238 parts by weight of the resulting solution, there was added a cooled solution of 5.2 parts by weight of a triisocyanate, stabilised with cresol, which was prepared by trimerising toluylene diisocyanate, in 40 parts by weight of cresol. The solution was further diluted by the addition of another 142 parts by weight of cresol. A copper wire enamelled with this solution showed an outstanding resistance both to abrasion and to solvents and had a cut-through-temperature of over 330° C.

Example 46

74 parts by weight of N,N'-bis-ethoxycarbonylmethyl-4,4'-diaminodiphenyl methane and 145 parts by weight of ethylene glycol monomethyl ether actate were heated to 80° C. 50 parts by weight of diphenylmethane-4,4'-diisocyanate were then introduced. The mixture was refluxed for 6 hours, resulting in the formation of a homogeneous solution (260 parts by weight).

A wire coil prepared in accordance with VDE 0360, para 21, was immersed in the solution. Following removal from the impregnation tank, any excess solution was allowed to drip off the wire coil. At the same time, most of the solvent was evaporated off. The coil thus coated was stoved in an oven starting at 120° C. The temperature was gradually raised to 160° C., over a period of two hours. The coil was then kept at this temperature for another 8 hours. It was then dipped for a second time and stoved in exactly the same way as before. The coil thus impregnated had a baking index of 3.2 at 155° C., as measured in accordance with VDE 0360, para 21.

Example 47

(a) 68.4 parts by weight of an N,N'-bis-(methoxycarbonylmethyl) - 4,4' - diaminodiphenyl methane, M.P. 118–119° (from acetone), prepared by condensing 4,4'-diaminodiphenylmethane with formaldehyde/hydrocyanic acid, followed by acid hydrolysis with methanol, were diluted with 290 parts by weight of cresol. 1 part by weight of endoethylene piperazine was then added, followed by the introduction at 25° C. of 50 parts by weight of 4,4'-diisocyanato-diphenyl methane. The mixture was left standing at room temperature for 6 days, and then heated for 6 hours at 200° C. 396 parts by weight of a product were obtained, which, following dilution with an equivalent quantity of cresol had a viscosity of cp.$_{25}$=3220.

(b) 2 parts by weight of dimethylbenzylamine, 1 part by weight of triethylamine or 2 parts by weight of N-methyl morpholine, were added in place of 1 part by weight of endoethylene piperazine. Practically the same viscosities were obtained.

A solution prepared in accordance with Example 47a or in accordance with Example 38, was applied in a pre-determined thickness by means of a dispenser to a heat-resistant support which comprised, for example, metal or glass and from which the finished film could readily be removed. The solvent was evaporated by heating to 150 to 200° C. and the finished film peeled off the support.

The film produced in this way exhibited outstanding mechanical properties and a high thermal stability under load. It melted at temperatures above 350° C.

Example 48

80 parts by weight of a cresol solution prepared according to Example 39 are diluted with 20 parts by weight of toluene and combined with 60–120 parts by weight of a suspension consisting of 1 part by weight of aluminum powder (in form of a paste) and 1 part by weight of cresol/toluene (1:1). The suspension is then stirred with a glass rod. 15–30 parts by weight of cresol/toluene (1:1) are subsequently added.

After exposing to air for a sufficiently long period of time enamelled sheet metal is baked at 250° C. for 45 minutes. After heating to 400° C. and subsequent exposure to a SO$_2$ atmosphere (Kesternich test), sheet metal enamelled with the product obtained and baked shows good properties.

Example 49

(a) 198 parts by weight of 4,4'-diaminodiphenylmethane, 200 parts by weight of calcium carbonate and 1500 parts by weight of water are heated to 80° C. and 244 parts by weight of chloroacetic acid ethyl ester are added dropwise at this temperature. The temperature is kept at 80° C. for another 2 hours and further 217 parts by weight of chloroformic acid ethyl ester are then added dropwise. After the evolution of carbon dioxide has finished the organic phase is separated from the aqueous calcium chloride solution, washed several times with hot water and taken up with approximately equal parts by weight of ethanol. Small amounts of 4,4'-bis-(N-carbethoxymethylamino) - diphenylmethane precipitate. After concentrating the ethanol solution there remains a viscous residue consisting of the desired 4,4'-bis-(N-carbethoxymethyl - N - carbethoxy) - diphenylmethane, the infrared spectrum of which is clearly identical with the assumed structure.

(b) 51.4 parts by weight of the glycine derivative obtained according to Example 49(a) and 19.9 parts by weight of 4,4'-diaminodiphenylmethane are heated to 200° C. in a stirrer-type flask under a nitrogen atmosphere. Small amounts of ethanol distill off. The temperature is slowly raised in the course for 10 hours to 250° C. and this temperature is maintained until the mass can hardly be stirred an longer. By the addition of cresol there is formed a 35% solution which clearly shows in the infrared spectrum the absorptions which are typical for an hydantoine configuration.

(c) Instead of diaminodiphenylmethane there can be used in Example 49(b) 20.1 parts by weight of 4,4'-diaminodiphenylether or 10.8 parts by weight of p-phenylenediamine.

(d) The solutions of polyhydantoines in cresol which are obtained by the aforesaid methods can mechanically be used in enamelling copper wire and yield temperature-resistant insulation coatings.

Example 50

(a) 280 parts by weight of 1,3-bis-(N-carbethoxymethyl-amino)-benzene are heated to 70° C. with 1000 parts by weight of water and 100 parts by weight of calcium carbonate. 217 parts by weight of chloroformic acid ethyl ester are then added dropwise. Working up which is carried out analogously to Example 49(a) yields the desired 1,3-bis-(N-carbethoxymethyl-N - carbethoxyamino)-benzene which is identified by the infrared spectrum.

(b) Analogously to Example 49(b) 42.4 parts by weight of the glycine derivatives obtained according to Example 50(a) are condensed with 19.9 parts by weight of 4,4'-diaminodiphenylmethane to form a polymer containing hydantoine groups which is taken up in form of a 40% cresol solution and used for example for enamelling sheet metal. The coatings thus obtained correspond to the polyhydantoine coatings obtained according to the preceding examples.

What is claimed is:

1. Polyhydantoin polymers containing the recurring structural unit

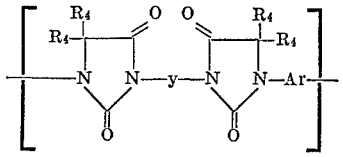

wherein Ar represents an aromatic hydrocarbon radical, R$_4$ represents hydrogen and alkyl having 1 to 6 carbon atoms and y represents an aromatic hydrocarbon radical, an alkyl radical having 4 to 10 carbon atoms and an alkyl radical having 4 to 10 carbon atoms wherein one or more than one carbon atom is replaced by oxygen or sulfur.

2. Polyhydantoine polymers of the formula

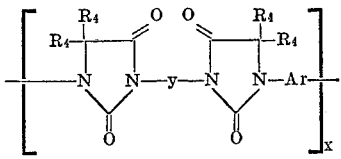

wherein Ar is a radical derived from benzene, azobenzene, naphthaline, anthracene, diphenyl triphenylmethane, a diphenylalkane, a diphenylalkene, diphenylether, diphenylthioether and a polyphenylether, $R_4$ represents hydrogen and alkyl having 1 to 6 carbon atoms, y represents Ar and an alkyl radical having 4 to 10 carbon atoms and an alkyl radical having 4 to 10 carbon atoms wherein one or more than one carbon atom is replaced by oxygen or sulfur and x represents a number between 20 and 5000.

3. A hydantoin polymer according to claim 2 wherein the radical Ar is substituted by alkyl-, halogen-, nitroalkoxy-, dialkylamino-, acyl-, carbalkoxy and cyano radicals.

4. A hydantoin polymer of the formula

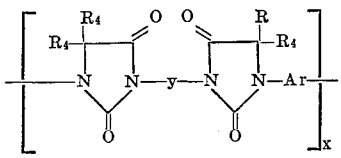

wherein Ar is a benzene-, naphthalene-, diphenylmethane- and a diphenylether radical, which radicals carry hydrogen atoms, methyl groups and chlorine atoms as substituents, $R_4$ is hydrogen and an alkyl radical having 1 to 6 carbon atoms, y is Ar and an alkyl radical having 4 to 10 carbon atoms and x represents a number between 20 and 5000.

5. The hydantoin polymer having the recurring unit

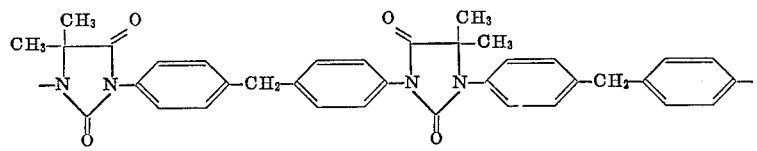

6. The hydantoin polymer having the recurring unit

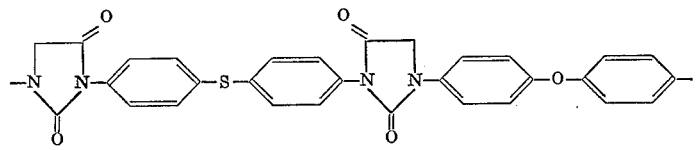

7. The hydantoin polymer having the recurring unit

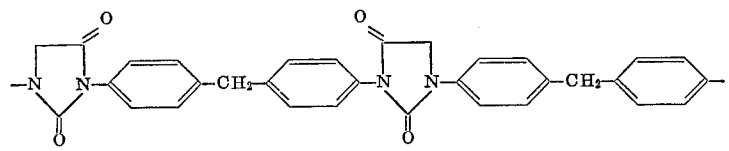

8. A composition of matter comprising the hydantoin polymer of claim 1 and a polymer from the group consisting of polyesters, polyamides, polyurethanes, polyolefins, polyacetals, polyepoxides, polyimides, polyamidimides, polyimino-polyesters and polyimide isocyanates in a weight ratio of from 10:90 to 90:10.

9. A composition of matter comprising the hydantoin polymer of claim 1 and a polymer from the group consisting of polyesters, polyamides, polyurethanes, polyolefins, polyacetals, polyepoxides, polyimides, polyamidimides, polyimino-polyesters and polyimide isocyanates in a weight ratio of 50:50.

10. Process for producing hydantoin polymers which comprises heating to a temperature of between 80 and 500° C. a mixture of a glycine compound of the general formula

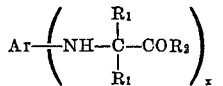

wherein Ar represents an aromatic radical, $R_1$ represents hydrogen or alkyl, $R_2$ represents the hydroxyl radical, an amino group, an alkylamino-, dialkylamino-, alkoxy- and an aroxy group and x is an integer between 2 and 4 and an aromatic di- and polyisocyanate.

11. Process for producing hydantoin polymers which comprises heating to a temperature of between 80 and 500° C. a mixture of a glycine compound of the general formula

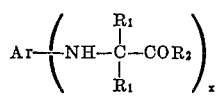

wherein Ar represents an aromatic radical, $R_1$ represents hydrogen or alkyl, $R_2$ represents the hydroxyl radical, an amino group, an alkylamino-, dialkylamino-, alkoxy- and an aroxy group and x is an integer between 2 and 4 and an aromatic di- and polyisothiocyanate and its derivatives.

12. Process for producing hydantoin polymers which comprises heating to a temperature of between 80 and 500° C. a mixture of a glycine compound of the general formula

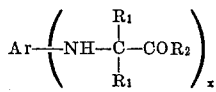

wherein Ar represents an aromatic radical, $R_1$ represents hydrogen or alkyl, $R_2$ represents the hydroxyl radical, an amino group, an alkylamino-, dialkylamino-, alkoxy- and an aroxy group and x is an integer between 2 and 4 and an aromatic di- and polyisocyanate, in the presence of an organic solvent.

13. Process for producing hydantoin polymers which comprises heating to a temperature of between 80 and 500° C. a mixture of a N-carboxy glycine compound of the formula

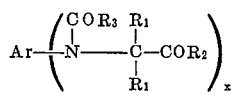

wherein Ar represents an aromatic radical, $R_1$ represents hydrogen and alkyl, $R_2$ represents the hydroxy radical, an amino group, an alkylamino group, a dialkylamino group, an alkoxy and an aroxy group, R₃ represents a dialkyl amino group, an alkoxy group, or an aroxy group, and x is an integer between 2 and 4 and an aliphatic, cycloaliphatic or aromatic diamine.

14. Process for producing hydantoin polymers which comprises heating to a temperature of between 80 and 500° C. a mixture of a N-carboxy glycine compound of the formula

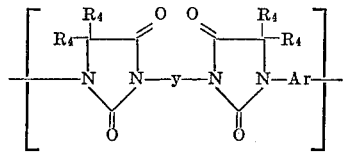

wherein Ar represents an aromatic radical, R₁ represents hydrogen and alkyl, R₂ represents the hydroxy radical, an amino group, an alkylamino group, a dialkylamino group, an alkoxy and aroxy group, R₃ represents a dialkyl amino group, an alkoxy group, or an aroxy group, and x is an integer between 2 and 4 and an aliphatic, cycloaliphatic and aromatic diamine, in the presence of an inert organic solvent.

15. A lacquer or enamel mixture comprising a polyhydantoin polymer containing the recurring unit

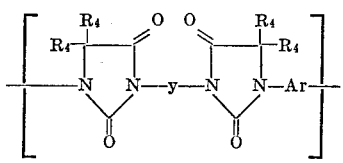

wherein Ar represents an aromatic hydrocarbon radical, R₄ represents hydrogen and alkyl having 1 to 6 carbon atoms and y represents an aromatic hydrocarbon radical, an alkyl radical having 4 to 10 carbon atoms and an alkyl radical having 4 to 10 carbon atoms wherein one or more than one carbon atom is replaced by oxygen or sulfur, and a solvent.

16. A lacquer mixture comprising a polyhydantoin polymer containing the recurring unit

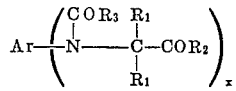

wherein Ar represents an aromatic hydrocarbon radical, R₄ represents hydrogen and alkyl having 1 to 6 carbon atoms and y represents an aromatic hydrocarbon radical, an alkyl radical having 4 to 10 carbon atoms and an alkyl radical having 4 to 10 carbon atoms wherein one or more than one carbon atom is replaced by oxygen or sulfur, a solvent and a further polymer selected from the group consisting of polyesters, polyamides, polyurethanes, polyolefins, polyacetals, polyepoxides, polyimides, polyamidimides, polyimino-polyesters and polyimide isocyanates.

17. A method of producing coatings on metals which comprises mixing a glycine compound of the formula

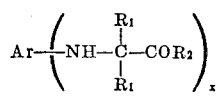

wherein Ar represents an aromatic radical, R₁ represents hydrogen or alkyl, R₂ represents the hydroxyl radical, an amino group, an alkylamino-, dialkylamino-, alkoxy- and an aroxy group and x is an integer between 2 and 4, solved in an inert organic solvent and a solution of an aromatic diisocyanate in an inert organic solvent, applying this mixture to a substrate and heating the substrate to a temperature of 80 to 500° C.

References Cited

UNITED STATES PATENTS 3,296,208   1/1968   Regens _____ 260—309.5

OTHER REFERENCES

Chemical Abstracts vol 57, 11, 366i (1962) Y. Shimodoi, Kogyo Kagaha Tasshi 65 pp. 515–519 (1962).

MURRAY TILLMAN, *Primary Examiner.*

P. LIEBERMAN, *Assistant Examiner.*